US012360955B2

(12) United States Patent
More

(10) Patent No.: US 12,360,955 B2
(45) Date of Patent: Jul. 15, 2025

(54) DATA COMPRESSION AND DECOMPRESSION FACILITATED BY MACHINE LEARNING

(71) Applicant: Amir More, Tel Aviv (IL)

(72) Inventor: Amir More, Tel Aviv (IL)

(73) Assignee: Amir More, Tel Aviv (IL)

( * ) Notice: Subject to any disclaimer, the term of this patent is extended or adjusted under 35 U.S.C. 154(b) by 0 days.

(21) Appl. No.: 18/115,713

(22) Filed: Feb. 28, 2023

(65) Prior Publication Data

US 2023/0325357 A1    Oct. 12, 2023

Related U.S. Application Data

(63) Continuation of application No. 16/798,003, filed on Feb. 21, 2020, now Pat. No. 11,615,057.

(60) Provisional application No. 62/810,721, filed on Feb. 26, 2019.

(51) Int. Cl.
G06F 16/174    (2019.01)
G06N 3/045    (2023.01)
G06N 3/088    (2023.01)

(52) U.S. Cl.
CPC ......... *G06F 16/1744* (2019.01); *G06N 3/045* (2023.01); *G06N 3/088* (2013.01)

(58) Field of Classification Search
None
See application file for complete search history.

(56) References Cited

U.S. PATENT DOCUMENTS

| 7,050,639 | B1 * | 5/2006 | Barnes | H04N 19/15 |
| | | | | 375/E7.182 |
| 2005/0058437 | A1 * | 3/2005 | Meier | H04N 19/13 |
| | | | | 375/E7.226 |
| 2005/0190980 | A1 | 9/2005 | Bright | |

(Continued)

FOREIGN PATENT DOCUMENTS

CN    107396124 A    11/2017

OTHER PUBLICATIONS

Alvar et al., "Multi-Task Learning With Compressible Features For Collaborative Intelligence", Feb. 14, 2019, arXiv:1902.05179v1 (Year: 2019).*

(Continued)

*Primary Examiner* — Hosain T Alam
*Assistant Examiner* — Robert F May
(74) *Attorney, Agent, or Firm* — POLSINELLI LLP

(57) ABSTRACT

Disclosed herein are embodiments for compressing data. A first encoding, a decoding, and an error prediction index are received from one or more artificial neural networks. The first encoding corresponds to a lossy compression of the data. The decoding corresponds to a decompression of the first encoding. The error prediction index indicates one or more locations of predicted error in the decoding. Based on the data and the error prediction index, a first set of bits is generated to include one or more bit values of the data at the one or more locations of predicted error. Based on the error prediction index and the decoding, a second set of bits is generated to indicate one or more locations of unpredicted error in the decoding. The first encoding, the first set of bits, and the second set of bits are stored as a losslessly compressed version of the data.

18 Claims, 9 Drawing Sheets

(56) References Cited

U.S. PATENT DOCUMENTS

| | | | | |
|---|---|---|---|---|
| 2007/0208893 | A1* | 9/2007 | Azzarello | G06F 16/1744 710/68 |
| 2008/0144079 | A1* | 6/2008 | Pandey | H03M 7/30 358/1.15 |
| 2010/0332454 | A1* | 12/2010 | Prahlad | G06F 16/41 707/696 |
| 2012/0284587 | A1* | 11/2012 | Yu | G06F 12/0868 711/E12.008 |
| 2013/0018932 | A1* | 1/2013 | Bhaskar | H03M 7/3088 708/203 |
| 2014/0022098 | A1* | 1/2014 | Fallon | H03M 7/4006 341/87 |
| 2014/0070966 | A1* | 3/2014 | Fablet | H03M 7/3086 341/55 |
| 2014/0122964 | A1 | 5/2014 | Chen | |
| 2015/0201191 | A1* | 7/2015 | Cheong | H04N 19/119 382/166 |
| 2016/0019184 | A1 | 1/2016 | Hughes | |
| 2016/0371190 | A1* | 12/2016 | Romanovskiy | G06F 3/0659 |
| 2019/0147284 | A1* | 5/2019 | Gavrilyuk | G06T 7/73 382/103 |
| 2020/0021815 | A1 | 1/2020 | Topiwala | |
| 2020/0218461 | A1* | 7/2020 | Faibish | G06F 3/0608 |
| 2020/0249877 | A1* | 8/2020 | McIlroy | G06F 16/1744 |
| 2020/0364545 | A1 | 11/2020 | Shattil | |
| 2022/0382717 | A1* | 12/2022 | Zhang | G06F 16/1744 |
| 2024/0013864 | A1* | 1/2024 | Cheung | H03M 7/607 |
| 2024/0119027 | A1* | 4/2024 | Ferragina | G06F 16/14 |

OTHER PUBLICATIONS

Notice of Allowance for U.S. Appl. No. 16/798,003, filed Feb. 20, 2010, dated Nov. 30, 2022, 12 pages.

Ayoobkhan et al., Lossy Image Compression Based on Prediction Error and Vector Quantisation, May 18, 2017, EURASIP Journal on Image and Video Processing vol. 2017, Article No. 35 (Year: 2017).

Hussain et al., "Image Compresion Techniques: A survey in Lossless and Lossy Algorithms", Jul. 2018 Neurocomputing vol. 300, (Year: 2018), pp. 44-69.

Schiopu et al., "Residual-Error, Prediction Based on Deep Learning for Lossless Image Compression", Aug. 1, 2018, Electronic Letters, Vo 2018) vol. 54, Issue 17 (Year: 2018).

First Action Interview Office Action Summary for U.S. Appl. No. 16/798,003, filed Feb. 21, 2020, 3 pages.

First Action Interview Pilot Program Pre-Interview Communication for U.S. Appl. No. 16/798,003, filed Feb. 21, 2020, 5 pages.

\* cited by examiner

DATA COMPRESSION AND DECOMPRESSION FACILITATED BY MACHINE LEARNING

CROSS-REFERENCE TO RELATED APPLICATIONS

This application is a Continuation application of U.S. patent application Ser. No. 16/798,003 filed Feb. 21, 2020, which claims the benefit of U.S. Provisional Application No. 62/810,721, filed Feb. 26, 2019, which is hereby incorporated by reference in its entirety and for all purposes.

TECHNICAL FIELD

The present disclosure relates generally to information storage and retrieval technology. More specifically, embodiments disclosed herein are related to data compression and decompression facilitated by machine learning.

BACKGROUND

Lossless compression and decompression of data typically involve sequentially processing a stream of data that exhibits repetition. For example, current data storage systems often use Lempel-Ziv based lossless compression algorithms (e.g., LZ77, LZ78, DEFLATE, PKZIP, RAR, etc.) of a sequential nature. The Lempel-Ziv based algorithms, derivatives, and variants were designed primarily for data streams with the goal of preserving bandwidth through the use of a shared dictionary. Thus, compression and decompression are based on tokens that represent relatively longer pieces of data appearing multiple times in the data stream.

However, such techniques suffer from a number of shortcomings. One shortcoming is the sequential run time inherent in sequentially processing a stream of data. This sequential run time often imposes a theoretical linear run time for compression and typically for decompression as well. Another shortcoming is that such techniques work best on data that include many instances of repeated patterns. Accordingly, if the data exhibits little to no repetition, then little to no benefit is derived from using such techniques.

There is, therefore, a need in the art for a more robust and efficient approach to lossless compression and decompression of data.

Figure 1:
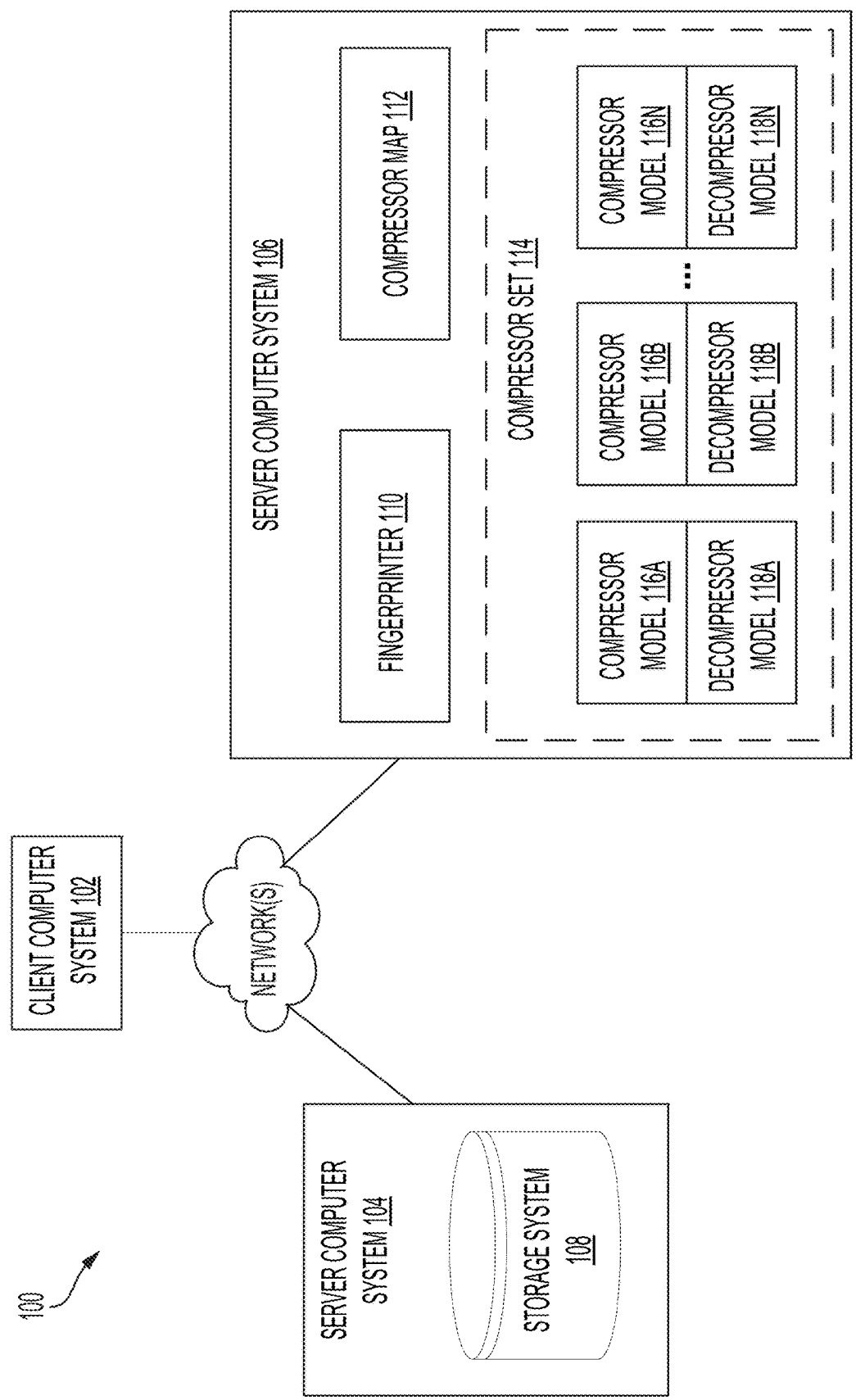
FIG. 1 depicts an example system for performing the techniques disclosed herein.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. The terms "set" and "subset" do not necessarily denote a mathematical set and a mathematical subset. Modifiers such as "first" and "second" are used to differentiate elements and do not necessarily indicate any particular order.

Introduction

The present disclosure describes techniques for data compression and decompression facilitated by machine learning. Such techniques may be used to perform compression and decompression of data in a lossless manner even when the data does not exhibit repetition and is not processed sequentially.

Lossless compression of data may be achieved based on a process, at least some of which can be performed in parallel. The process may include leveraging machine learning techniques to yield (a) a lossy compression of the data and (b) a prediction as to which of the data will be lost through the lossy compression (hereinafter "predicted error"). The process may also include determining which of the data was indeed lost through the lossy compression but was missed in the prediction (hereinafter "unpredicted error"). Furthermore, the process may include storing together at least the following elements:

the lossy compression of the data;
correct values for the predicted error; and
an index for the unpredicted error.

Together, the aforementioned elements may constitute a losslessly compressed version of the data.

Decompression may also be achieved based on a process, at least some of which can be performed in parallel. The process may include receiving the losslessly compressed version of the data. As mentioned above, the losslessly compressed version may include the lossy compression of the data, the correct values for the predicted error, and the index for the unpredicted error. The process may also include leveraging machine learning techniques to yield a decompression of the lossy compression and an index for the predicted error. Additionally, the process may include correcting the decompression for the predicted error using the index for the predicted error and the correct values for the predicted error. Furthermore, the process may include correcting the decompression for the unpredicted error using the index for the unpredicted error. As a result, a pre-compression version of the data may be losslessly re-created.

The techniques described herein offer a number of advantages over conventional approaches for achieving lossless data compression and decompression. Some examples of these advantages include the following:

(a) algorithms (such as those pertaining to compression and decompression) belong to the circuit complexity class of $NC^1$ involving gates/components from the following list: addition, multiplication, AND, OR, NAND, and XOR (thus, an automaton or Turing machine is not required for execution of any of the algorithms);

(b) the theoretical upper bound on run time, and therefore latency, can be mathematically proven to be O(log n) or logarithmic as a function of the size of input data;

(c) algorithms (such as those pertaining to fingerprinting, compression, and decompression) can be executed using vectorized/parallel operations (as opposed to serial processing);

(d) as a result of (a), there is no branching, and therefore, when emulating execution of the circuit in the form of a program on a Turing machine (such as an x86 processor), it is possible to make optimal use of processor compute and bandwidth resources and eliminate pipeline stall, thereby minimizing latency (as opposed to Lempel-Ziv algorithms that frequently branch); and (e) as a result of (a), it is possible to implement the fingerprinting and compression algorithms with any one or any combination of: parallelization using multiple CPU cores, parallelization using GPUs, implementations in FPGAs, implementation as electrical circuits, or implementation using specialized artificial intelligence hardware (such as one or more Tensor Processing Units).

Example System Architecture

FIG. 1 depicts an example system 100 that may be used to perform the techniques disclosed herein. In the example of FIG. 1, the system 100 includes a client computer system 102 as well as server computer systems 104 and 106. However, it should be appreciated that the example system 100 is only one of many possible embodiments and that other embodiments are equally contemplated in this disclosure. For example, although FIG. 1 depicts the client computer system 102 and the server computer system 104 as different computer systems separated by one or more networks, in some alternative embodiments, the client computer system 102 and the server computer system 104 may be implemented as components of the same computer system, such as a database server computer system in which a user interface component (such as database management software) and a data storage component respectively perform the functions of the client computer system 102 and the server computer system 104 of FIG. 1.

In the example of FIG. 1, the client computer system 102 may be a desktop computer, a laptop computer, a tablet computer, a smartphone, or any other computing device or component thereof that is capable of interacting with the server computer system(s) 104 and/or 106. For example, the client computer system 102 may issue a command to the server computer system 104 and/or receive output from the server computer system 104. In some embodiments, the client computer system 102 may host a database management system or a logical file system.

In some embodiments, the client computer system 102 may issue a write command with a logical block address and a data block. Although the example of a data block is used for the purposes of providing a clear explanation, it should be appreciated that the techniques disclosed herein are equally applicable to any other ordered collection of structured and/or unstructured data.

As used herein, a data block refers to an atomic unit of storage space allocated to store data for a file system, a database system, or any other block storage system, including a storage area network (SAN). For example, a data block may store raw data for one or more database records or portions thereof. Typically, the size of a data block in bytes is a power of two, is greater than or equal to 512, and smaller than 32 kilobytes. For example, a file system block size or a database block size may be 4 kilobytes.

Figure 2:
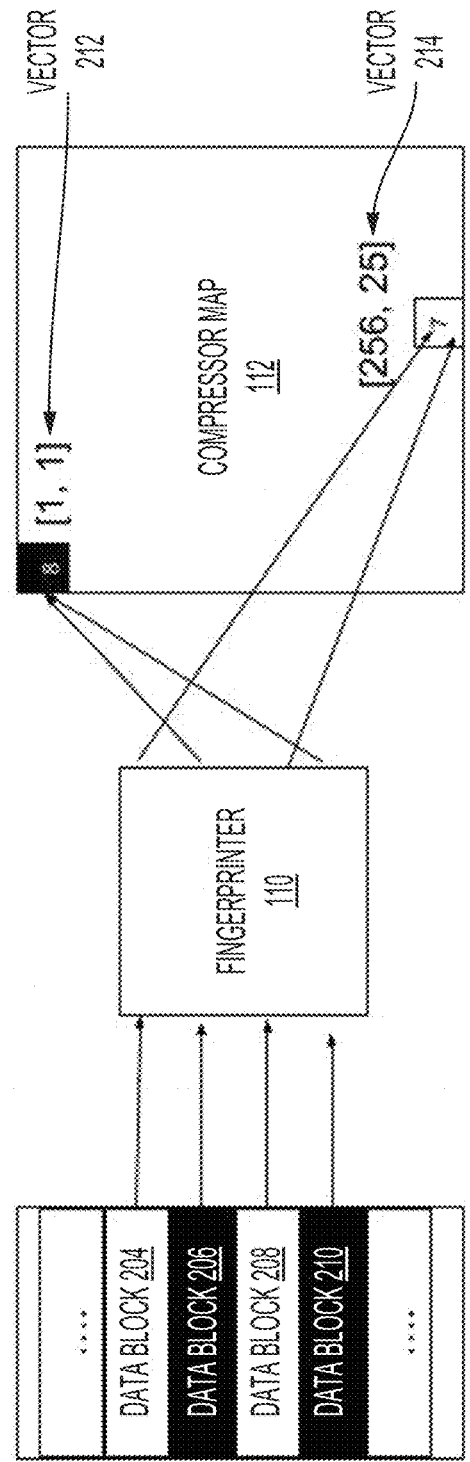
FIG. 2 depicts an example approach for determining a suitable compressor and/or decompressor model for a data block.

Examples of data blocks are provided with reference to FIG. 2, which depicts database tables 200 and 202. In the example of FIG. 2, data blocks 204 and 208 store information from database table 200, whereas data blocks 206 and 210 store information from database table 202. In some embodiments, the database tables 200 and 202 are tables in a database on the client computer system 102. The rows of the database tables 200 and 202 can be laid out such that one or more arbitrary rows can be stored in one or more units of fixed size, such as 8 kilobytes. In some embodiments, the use of data blocks for storage may be characterized by piece-wise access of data blocks that can be as small as 2 kilobytes. Thus, when database software stores information on a disk (or whatever is presented to the database software as a disk for data storage by the operating system), data blocks from one or more database tables can be written in any arbitrary order.

Significantly, data blocks are often accessed in a random manner and in very small chunks. Thus, data blocks are unsuitable for many compression models, particularly those that process data sequentially to leverage repetition in the data. For example, many compression models employ a shared dictionary to encode repeated instances of previously processed information. However, as data blocks get smaller, it becomes much harder to capitalize on information that is processed twice.

In some embodiments, the client computer system 102 may issue a read command with a logical block address. In such embodiments, the output received by the client computer system 102 may be the data block corresponding to the logical block address. The data block may be an uncompressed data block or a decompressed data block.

Although FIG. 1 depicts two server computer systems 104 and 106, it should be appreciated that the techniques disclosed herein can be practiced using any number of server computer systems, including one server computer system. For example, in some embodiments, the server computer systems 104 and 106 may be combined into a single server computer system that is an end-to-end compression system for data block storage. In such embodiments, the compression system may use one or more neural networks in combination with error prediction and error correction to achieve lossless compression.

In some embodiments, the server computer system(s) 104 and/or 106 may facilitate provision of cloud-based services to the client computer system 102. In some embodiments, the server computer system(s) 104 and/or 106 may facilitate provision of on-premise services to the client computer system 102. To avoid unnecessarily obscuring the disclosure, FIG. 1 omits depiction of certain front-end server computers, load-balancing server computers, and/or other server computers that are not central to the disclosure.

In the example of FIG. 1, the server computer system 104 comprises a storage system 108. However, it should be appreciated that in some embodiments, the server computer system 104 and the storage system 108 may be separate systems that are communicatively coupled to each other.

Referring to FIG. 1, the server computer system 104 may receive a command from the client computer system 102 and forward all or part of the command to the server computer system 106 or the storage system 108. For example, the server computer system 104 may receive a write command comprising a data block and forward the data block to the server computer system 106 for compression. As another example, the server computer system 104 may receive a read command and forward it to the storage system 108.

In some embodiments, responsive to forwarding a data block to the server computer system 106 for compression, the server computer system 104 may receive, from the server computer system 106, output including a lossy compression of the data block. The server computer system 104 may further process the output to generate a losslessly compressed version of the data block. As will be described in greater detail below, further processing the output may involve a lossless compression algorithm comprising such elements as error prediction and/or error correction. The server computer system 104 may transmit the losslessly compressed version of the data block to the storage system 108.

In some embodiments, responsive to forwarding the read command to the storage system 108, the server computer system 104 may receive, from the storage system 108, a data block and an indication of whether or not the data block is compressed. Based on analyzing the indication, the server computer system 104 may determine whether or not the data block is compressed. If the data block is uncompressed, the server computer system 104 may forward the data block to the client computer system 102. However, if the data block is compressed, the server computer system 104 may cause the data block to be decompressed before transmitting it to the client computer system 102. Causing decompression may involve sending the compressed data block to the server computer system 106, receiving output including a partially decompressed data block from the server computer system 106, and further processing the output to generate a fully decompressed data block.

The storage system 108 may comprise any machine-readable medium capable of storing data blocks. For example, the storage system 108 may comprise one or more magnetic disks, electrically erasable programmable read-only memory (EEPROM), an optical storage device, and/or any other form of secondary memory. The storage system 108 may store uncompressed data blocks and/or compressed data blocks.

In some embodiments in which the client computer system 102 issues a write command, the storage system 108 may receive a losslessly compressed data block from the server computer system 104. In such embodiments, the storage system 108 may store the losslessly compressed data block at a logical block address specified by the write command. Additionally, the storage system 108 may store updated metadata indicating the size of the losslessly compressed data block.

In some embodiments, responsive to the storage system 108 receiving a read command originating from the client computer system 102, the storage system 108 may transmit, to the server computer system 104, a data block specified by the read command. Additionally, the storage system 108 may transmit, to the server computer system 104, an indication of whether or not the data block is compressed. The indication may be transmitted together with the data block.

The server computer system 106 may apply machine learning techniques to at least partially compress and/or to at least partially decompress data blocks. In some embodiments, the server computer system 106 may comprise one or more artificial neural networks. For example, the server computer system 106 may comprise a fingerprinter neural network, an autoencoder, and/or a variational autoencoder.

Compression and/or decompression models that leverage machine learning can provide a number of advantages over conventional models, which do not leverage machine learning. For example, a database table may comprise a pair of columns exhibiting a relationship that can be expressed as a function. To illustrate, a table of telephone call data may have a "time of day" column and a "length of call" column that are related in that call lengths get shorter as the day progresses. Thus, compression may be achieved based on forgoing storage of one of the columns, because one column may be used to derive the other column with a reasonable amount of accuracy. Notably, conventional techniques that rely on dictionary-based encoding would not be able to take advantage of such relationships. In contrast, machine learning techniques can be employed not only to automatically determine such relationships, but also to automatically leverage such relationships for efficient compression.

In the example of FIG. 1, the server computer system 106 comprises a fingerprinter 110, a compressor map 112, and a compressor set 114. The compressor set 114 comprises a plurality of compressor models 116A-N and a plurality of decompressor models 118A-N, where "N" connotes that any number of such elements may be used in embodiments. Each compressor model may have a related decompressor model that corresponds to it. For example, compressor model 116A may be used to convert uncompressed data into compressed data, whereas decompressor model 118A may be used to convert the compressed data into decompressed data that is similar to the uncompressed data.

It should be appreciated that the server computer system 106 of FIG. 1 merely represents one of many possible implementations for practicing the techniques disclosed herein. Although FIG. 1 depicts an implementation that supports the use of one or more autoencoders, the present disclosure contemplates various alternative implementations. For example, in some alternative embodiments, the server computer system 106 may comprise a parameter set instead of the compressor set 114, thereby facilitating the use of one or more variational autoencoders.

As mentioned above, the server computer system 106 may receive a data block for compression. For example, the server computer system 104 may send the data block with a compression request to the server computer system 106. As will be described in greater detail below, the server computer system 106 may generate a lossy compression of the data block based on using the fingerprinter 110, the compressor map 112, and the compressor set 114 to determine an efficient compression technique for the data block.

Referring to FIG. 1, the fingerprinter 110 may be implemented as a function, an algorithm, a neural network, and/or any other mode of correlating input data to a location in the compressor map 112. Hereinafter, such correlation of input data to a location in the compressor map 112 is referred to as "fingerprinting." A simple example of a fingerprinting process involves the fingerprinter 110 taking input data and applying a hash function to the input data. The output of the hash function may be a vector of numbers corresponding to a set of coordinates in the compressor map 112.

Figure 3:
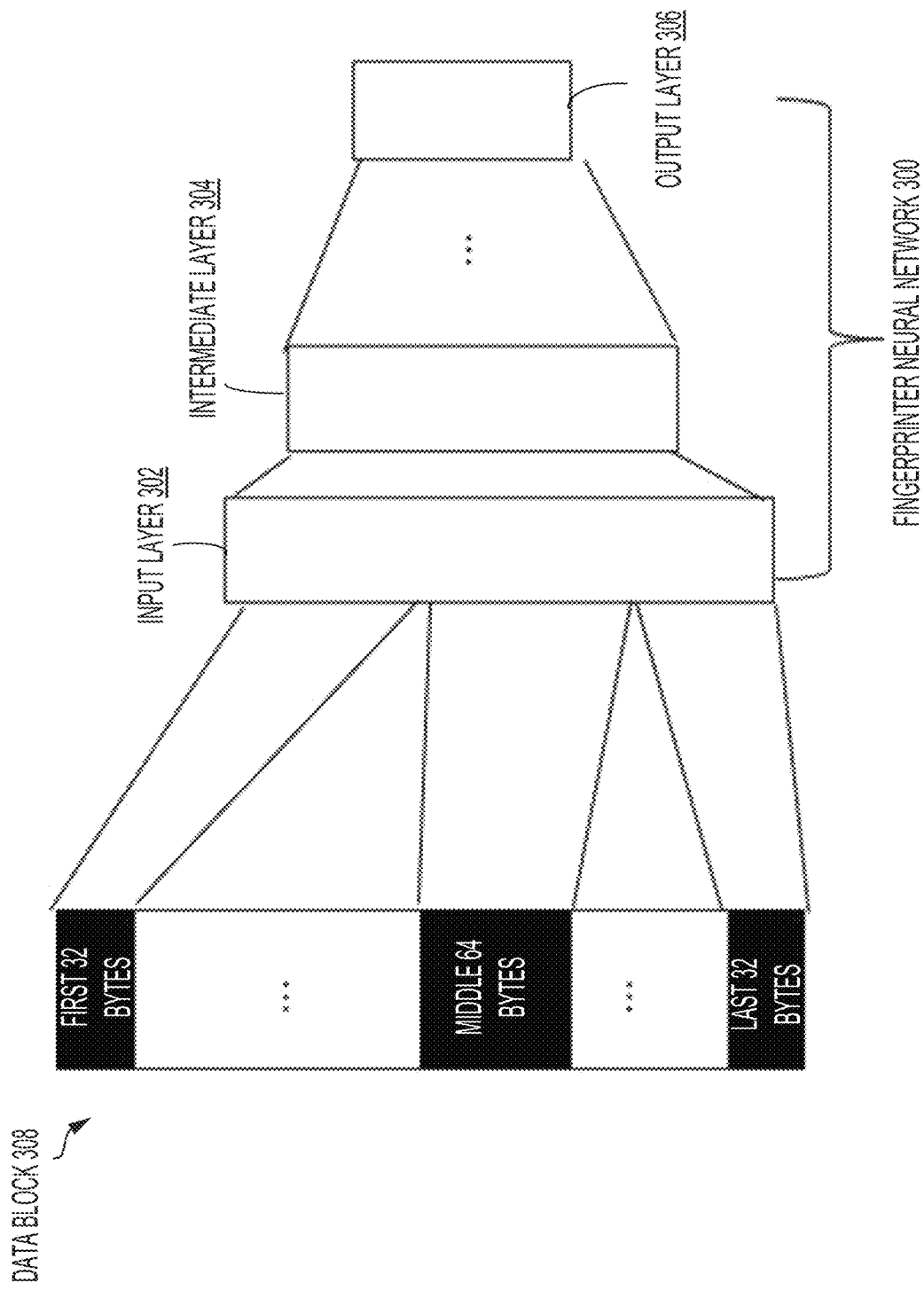
FIG. 3 depicts an example fingerprinter neural network.

However, in some embodiments, fingerprinting may be more efficiently and/or more accurately performed using a neural network. For example, FIG. 3 provides a depiction of the fingerprinter 110 as a fingerprinter neural network 300 that may use a neural network model similar to those used to employ methods of computer vision for facial recognition. The fingerprinter neural network 300 of FIG. 3 comprises an input layer 302, an output layer 306, and one or more intermediate layers 304. However, it should be appreciated that in some alternative embodiments, the fingerprinter neural network 300 may consist of a single layer or otherwise be devoid of any intermediate layers.

In the example of FIG. 3, fingerprinting is to be performed on a data block 308. However, it may be unnecessary to provide the data block 308 in its entirety as input to the input layer 302. Thus, instead of providing the data block 308 in its entirety to the input layer 302, it may be sufficient to merely provide one or more portions of the data block 308 as input to the input layer 302.

In some embodiments, the one or more portions of the data block 308 may correspond to a fixed subset of the data block 308. The fixed subset may comprise bits that are located at one or more predetermined positions of the data block 308. For example, the fingerprinter 110 may access the first X bits; the last Y bytes; the Z bytes starting from the middle; the bits at offsets A, B, and C; etc.

In some embodiments, the one or more predetermined positions can be thought of as specifying a fingerprinter access pattern. For example, FIG. 3 depicts the fingerprinter neural network 300 following an access pattern comprising the first 32 bytes, the last 32 bytes, and the 64 bytes starting from the midpoint of the data block 308. However, the fingerprinter 110 may use different access patterns for different data blocks. In some embodiments, the fingerprinter 110 may be constrained to one access pattern per data block. In some embodiments, each access pattern may be limited to accessing a fixed number of bytes in total.

Notably, the one or more predetermined positions of the data block 308 can be determined as a function of the size of the data block 308. This makes it unnecessary for the fingerprinter 110 to know the size of the data block 308 in advance. Thus, this feature enables the fingerprinter 110 to process data blocks of different lengths, thereby facilitating a faster run time and shorter latency.

As mentioned above, the fingerprinter neural network 300 may correlate the data block 308 to a location in the compressor map 112. The compressor map 112 may be implemented as a multidimensional array, a multidimensional vector, and/or any other data structure(s) for storing compressor identifiers. As used herein, a "compressor identifier" refers to any information identifying a particular mode of compression. For example, compressor identifiers may be used to identify compressor models 116A-N for use with autoencoders and/or to identify compressor parameters for use with variational autoencoders.

In some embodiments, the number of dimensions of the compressor map 112 may correspond to the size of the vector that is outputted from the fingerprinter 110. For example, the compressor map 112 may be a two-dimensional array, and the fingerprinter 110 may output a vector storing two numbers that can serve as a pair of coordinates in the compressor map 112. In some embodiments, the number of dimensions of the compressor map 112 and the size of the vector may have a fixed value, such as two.

FIG. 2 depicts an example two-dimensional implementation of the compressor map 112. In the example of FIG. 2, the compressor map 112 is depicted as having at least two locations— a location depicted in black and a location depicted in white. The location depicted in black corresponds to a vector 212 represented as [1, 1], and the location depicted in white corresponds to a vector 214 represented as [256, 25]. Notably, each of the vectors 212 and 214 store two numbers, and each of the numbers corresponds to a respective dimension of the compressor map 112.

In some embodiments, each of the numbers can be represented using eight bits, and each dimension of the compressor map 112 may have values in the range of 0 to 255, inclusive. Thus, the two 8-bit numbers can be used as indices. In embodiments in which the fingerprinter 110 is implemented using a neural network model, the vector output may be referred to as the embedding.

As depicted in FIG. 2, the vectors 212 and 214 are provided as output by the fingerprinter 110, which takes all or part of each of the data blocks 204-210 as input. FIG. 2 depicts both of the data blocks 204 and 208 in white, because they both store records of the same database table 200. Similarly, FIG. 2 depicts both of the data blocks 206 and 210 in black, because they both store records of the same database table 202.

Significantly, the fingerprinter 110 correlates the white data blocks 204 and 208 to the white location in the compressor map 112, and the fingerprinter 110 correlates the black data blocks 206 and 210 to the black location in the compressor map 112. More specifically, in the example of FIG. 2, the fingerprinter 110 assigns the same vector 212 to the black data blocks 206 and 210, and the fingerprinter 110 assigns the same vector 214 to the white data blocks 204 and 208.

However, in some alternative embodiments, the fingerprinter 110 may assign similar vectors to the white data blocks 204 and 208, and the fingerprinter 110 may assign similar vectors to the black data blocks 206 and 210. For example, the fingerprinter 110 may assign the vectors [1, 1] and [2, 1] to the black data blocks 206 and 210, respectively. In such embodiments, the black location may be larger such that it corresponds to both of the vectors [1, 1] and [2, 1]. Thus, the fingerprinter 110 may yield similar vectors for similar data blocks. Vectors may be deemed similar if they correspond to locations that are close to each other in the compressor map 112, and data blocks may be deemed similar if they store information from the same database table or the same file, for example.

In the example of FIG. 2, the white location stores the compressor identifier "7" corresponding to compressor model 116G, and the black location stores the compressor identifier "8" corresponding to compressor model 116H. Thus, it can be said that data blocks from the same database table may be compressed using the same compressor model/parameters, whereas data blocks from different database tables may be compressed using different compressor models/parameters. Since data blocks store small contiguous byte sequences of larger units of data, such as a file or database table, compression of data blocks may be efficiently performed using the compression techniques that are optimal/near-optimal for the characteristics of the larger units of data.

In some embodiments, correlations between data blocks and vectors may not be static. Thus, the correlations may change over time. For example, if a more efficient compressor model is determined for a data block, the data block may then be correlated with a vector corresponding to a different location in the compressor map 112, and the different location may store a compressor identifier for the more efficient compressor model.

Although not depicted in FIG. 1, in some embodiments, the server computer system 106 may comprise a compressor model manager. In such embodiments, data blocks may be assigned a compressor identifier when a sufficient number of them are assigned to similar vectors, and the compressor model manager may determine when there are enough similar blocks for a compressor to be assigned to them. The assigned compressor may already exist in the set of compressors. Alternatively, the assigned compressor can be a new compressor, such as an initially empty compressor model, that is allocated according to the assignment.

Although not depicted in FIG. 1, in some embodiments, the server computer system 106 may comprise a compressor model training system. In such embodiments, when a new compressor model is allocated, a request to train the new compressor model can be enqueued, and the compressor model training system can also dequeue training requests for new compressor models. In some embodiments, the compressor model training system can select a kind of compressor model that fits one or more data blocks associated with the training request. Additionally, the compressor model training system can create, initialize, and train a new compressor model corresponding to the associated data blocks. In some embodiments, the compressor model training system can continuously train a compressor model while monitoring a compression ratio. In some embodiments, a compressor model can continue to be trained until one or more events occurs. Examples of such events include a determination that the compression ratio is not likely to/cannot/will not improve and/or a determination that one or more new data blocks used to improve the compressor model are not likely to/cannot/will not be associated with the compressor model.

In some embodiments, when training ceases, a trained compressor model can replace an empty model with the same identifier in the compressor set allocated by the compressor model manager. In some embodiments, the compressor model training system can choose to start with a pre-trained model. In some embodiments, the compressor model training system can further train the pre-trained model with one or more of the data blocks associated with the training request.

Referring back to FIG. 1, the server computer system 106 may use a compressor identifier to select a corresponding compression technique from the compressor set 114. Similarly, the server computer system 106 may use a decompressor identifier to select a corresponding decompression technique from the compressor set 114. As used herein, a "decompressor identifier" refers to any information identifying a particular mode of decompression. For example, decompressor identifiers may be used to identify decompressor models 118A-N for use with autoencoders and/or to identify decompressor parameters for use with variational autoencoders. In some embodiments, a decompressor identifier may be the same as its corresponding compressor identifier.

As mentioned above, the server computer system 106 may receive a compressed data block for decompression. For example, the server computer system 104 may send the compressed data block with a decompression request to the server computer system 106. As will be described in greater detail below, the decompression request may include a decompressor identifier. Based on the decompressor identifier, the server computer system 106 may determine an efficient decompression technique for generating a decompressed version of the compressed data block.

Example Approaches for Achieving Lossless Data Compression

Figure 4:
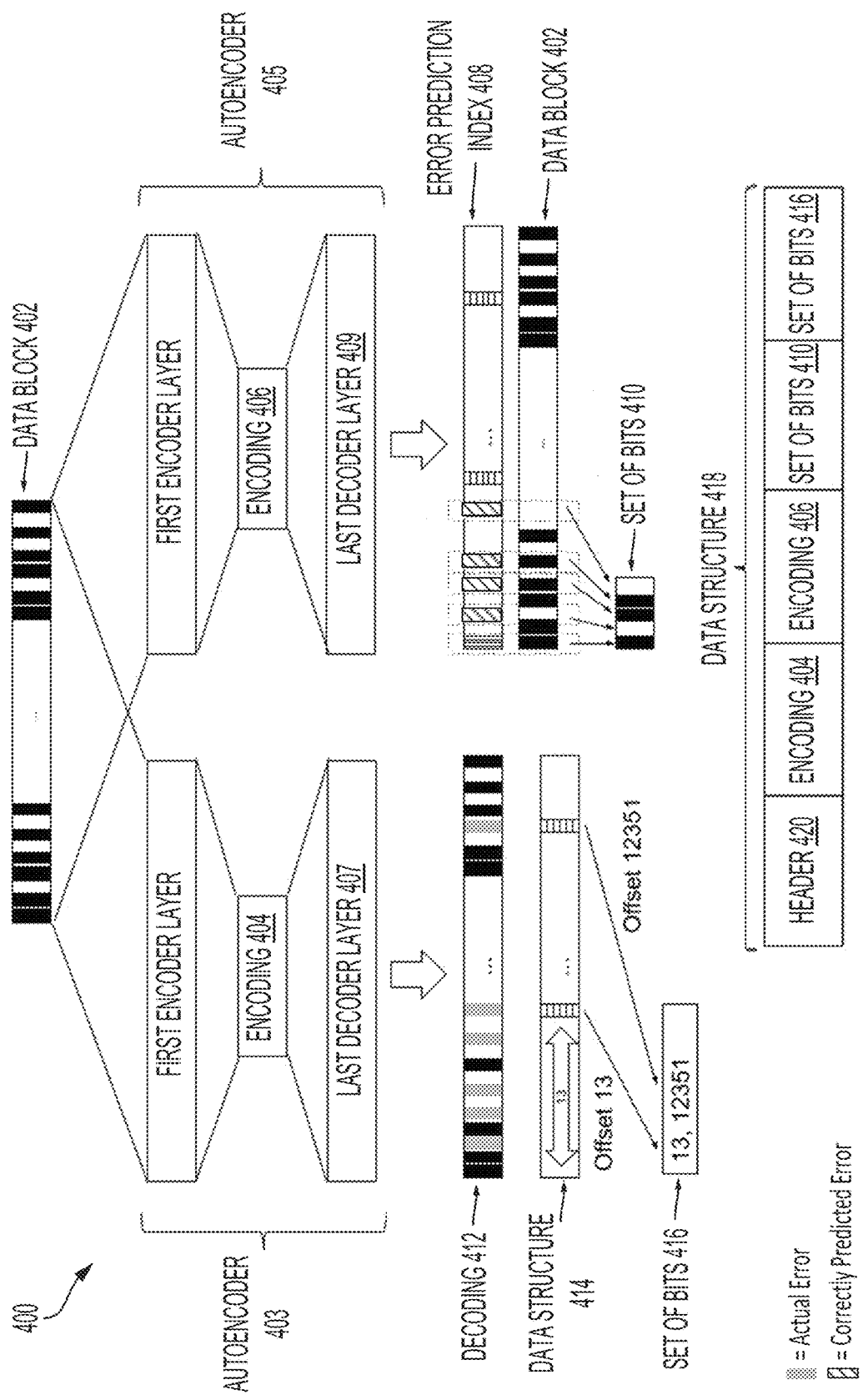
FIG. 4 depicts an example compression process.

FIG. 4 depicts an example compression flow 400 for generating a losslessly compressed version of a data block 402. In some embodiments, the data block 402 may be 2 kilobytes in an uncompressed form, but the losslessly compressed version may be only 256 bytes. In the figures, the bit value "1" is depicted as a black rectangle, and the bit value "0" is depicted as a white rectangle.

In the example of FIG. 4, the data block 402 is provided as input to autoencoders 403 and 405, which may concurrently process the data block 402. Each of the autoencoders 403 and 405 may comprise one or more encoder layers and one or more decoder layers, and the last encoder layer may serve as input to the first decoder layer. However, for the purpose of providing a clear explanation, only the first encoder layer and the last decoder layer 407, 409 of each of the autoencoders 403 and 405 are depicted in FIG. 4.

The autoencoder 403 may be trained to generate an efficient albeit lossy compression of input data. More specifically, the encoder layers of the autoencoder 403 may apply an appropriate compressor model to yield an encoding 404 that is a lossy compression of the data block 402. Additionally, the decoder layers of the autoencoder 403 may apply an appropriate decompressor model to yield a decoding 412 that has the same size as the data block 402 and that includes one or more actual errors. As used herein, an "actual error" may be a bit value of "1" where a bit value of "0" should have been located or vice versa. In the figures, an actual error is depicted as a gray rectangle. As will be described in greater detail below, an actual error may also correspond to a predicted error or an unpredicted error.

In some embodiments, the autoencoder 403 can be trained by feeding one or more similar data blocks into the autoencoder 403. In such embodiments, training can be optimized so that the output is as close as possible to the input.

The autoencoder 405 may be trained to predict errors in the lossy compression generated by the autoencoder 403. More specifically, the encoder layers of the autoencoder 403 may yield an encoding 406 that is a representation of predicted error in the encoding 404. Additionally, the decoder layers of the autoencoder 405 may yield an error prediction index 408 that has the same size as the data block 402 and that indicates one or more locations of predicted error in the decoding 412.

The error prediction index 408 may be implemented using any of a variety of data structures. For example, in some embodiments, the error prediction index 408 may be implemented as an array, vector, or any other data structure comprising bits that can be used as a bitmask in a "gather" operation. The bitmask may have the same or similar size as the data block 402. However, in some alternative embodiments, the error prediction index 408 may be implemented as a data structure that stores a list of offsets corresponding to predicted error.

For ease of reference, FIG. 4 depicts the error prediction index 408 as a bitmask with annotations for both predicted error and unpredicted error. These annotations correspond to the gray rectangles representing actual error in the decoding 412. However, it should be appreciated that in reality, the autoencoder 405 would yield a bitmask similar to the one depicted in FIG. 5 as an error prediction index 508. Notably, the error prediction index 508 includes black rectangles indicating predicted error but does not include any indication of unpredicted error.

Referring back to FIG. 4, the black rectangles of the error prediction index 508 correspond to the rectangles of the error prediction index 408 having vertical or diagonal stripes. In the figures, a vertically-striped rectangle represents incorrectly predicted error, and a diagonally-striped rectangle represents correctly predicted error. However, regardless of whether predicted error is correctly or incorrectly determined, any predicted error can be "corrected" based on generating a set of bits 410. As used herein, predicted error is deemed "corrected" when a pre-compression value is determined for the predicted error, even if the pre-compression value is the same as the post-compression value.

As used herein, a "set of bits" refers to any data structure of known or unknown length, such as an array or vector, for storing an ordered collection of bits or bytes. The set of bits 410 may store one or more bit values of the data block 402 corresponding to one or more locations of predicted error. For example, FIG. 4 depicts the set of bits 410 as including the black or white rectangles of the data block 402 corresponding to the five locations indicated by the error prediction index 408. Although the set of bits 410 is explicitly referred to as being a "set of bits," it should be appreciated that any of the data structures described herein may also be referred to as a set of bits. For example, the encoding 404, the encoding 406, the error prediction index 408, and the decoding 412 may each be implemented as a set of bits.

In some embodiments, generating the set of bits 410 may be performed using a "gather" operation. The error prediction index 408 and the data block 402 may be provided as input to the gather operation such that the error prediction index 408 is used to determine which values of the data block 402 to store in the set of bits 410 as output. In some embodiments, the gather operation may be a single instruction, multiple data (SIMD) gather operation.

Achieving lossless compression may also involve accounting for unpredicted error in the decoding 412. In the figures, unpredicted error is depicted as a horizontally-striped rectangle. Unpredicted error can be determined in a variety of ways that exhibit varying degrees of efficiency.

For example, concurrently with generating the set of bits 410, a set of one or more actual errors in the decoding 412 may be determined based on performing a bitwise "XOR" operation between the decoding 412 and the data block 402. In some embodiments, the set of one or more actual errors may be stored in a data structure having the same size as the data block 402. One or more locations of unpredicted error may then be determined based on performing a bitwise "XOR" operation between the set of one or more actual errors and the error prediction index 408. The result may be a data structure 414 that has the same size as the data block 402 and that includes one or more bits set to indicate one or more locations of unpredicted error. In some embodiments, the data structure 414 may be used to generate a data structure, such as a set of bits 416, that stores one or more offsets corresponding to unpredicted error.

As another example, unpredicted error may be determined based on using the set of bits 410 and the error prediction index 408 to "correct" the decoding 412. In some embodiments, the corrected decoding may be stored in a data structure having the same size as the data block 402. Thereafter, a bitwise "XOR" operation may be performed between the corrected decoding and the data block 402 to generate the data structure 414. In some embodiments, the data structure 414 may then be used to generate the set of bits 416.

Other possible approaches for determining unpredicted error are also contemplated but omitted from the disclosure for the sake of brevity.

The example compression flow 400 yields a data structure 418, which can be stored in any machine-readable storage medium as a losslessly compressed version of the data block 402. In the example of FIG. 4, the data structure 418 is depicted as a concatenation of a header 420, the encoding 404, the encoding 406, the set of bits 410, and the set of bits 416. However, variations of the data structure 418 are also contemplated.

For example, instead of storing the set of bits 410, the data structure 418 may store a representation of offsets corresponding to locations of predicted error in the decoding 412. Additionally or alternatively, instead of storing the set of bits 416, the data structure 418 may store bit values of the data block 402 that correspond to locations of unpredicted error in the decoding 412.

In some embodiments, the header 420 may store a variety of information for facilitating decompression. For example, the header 420 may store information indicating that the encodings 404 and 406 are lossy compressions and that the sets of bits 410 and 416 can be used for error correction. Additionally or alternatively, the header 420 may store offsets demarcating boundaries between the header 420, the encoding 404, the encoding 406, the set of bits 410, and/or the set of bits 416. Additionally or alternatively, the header 420 may store the respective sizes of the encoding 404, the encoding 406, the set of bits 410, and/or the set of bits 416. Additionally or alternatively, the header 420 may store one or more decompressor identifiers.

Figure 6:
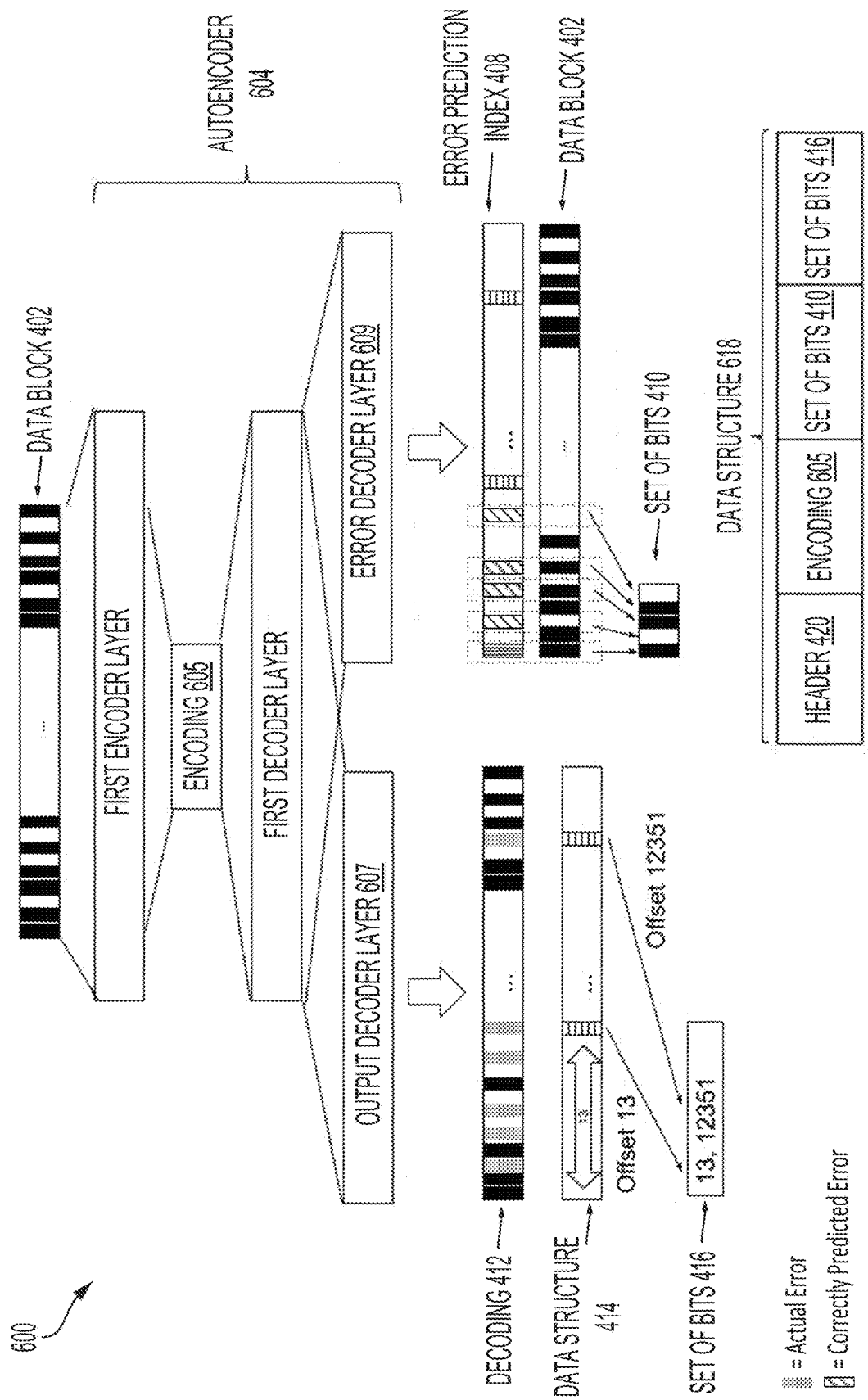
FIG. 6 depicts an example variant of the compression process.

FIG. 6 depicts an example alternative to the compression flow 400 of FIG. 4. More specifically, FIG. 6 depicts an example compression flow 600 involving a single autoencoder 604 that takes the data block 402 as input. Similar to the autoencoders 403 and 405 of FIG. 4, the autoencoder 604 may comprise one or more encoder layers and one or more decoder layers, and the last encoder layer may serve as input to the first decoder layer. However, for the purpose of providing a clear explanation, only the first encoder layer, the first decoder layer, an output decoder layer 607, and an error decoder layer 609 are depicted in FIG. 6. The output decoder layer 607 and the error decoder layer 609 correspond to the last decoder layer of the autoencoder 604. Thus, the last decoder layer of the autoencoder 604 has two components that, together, yield two outputs. Similar to the last decoder layer 407 of FIG. 4, the output decoder layer 607 of FIG. 6 yields the decoding 412; and similar to the last decoder layer 409 of FIG. 4, the error decoder layer 609 of FIG. 6 yields the error prediction index 408.

However, each of the output decoder layer 607 and the error decoder layer 609 may yield its respective output based on the first decoder layer taking an encoding 605 as input. The encoding 605 may be similar to the encoding 404 and/or the encoding 406. Thus, the example compression flow 600 yields a data structure 618 that is similar to the data structure 418 except that, instead of two encodings 404 and 406, a single encoding 605 is stored in the data structure 618.

All other descriptions of the example compression flow 400 may be applicable to the example compression flow 600.

Figure 7:
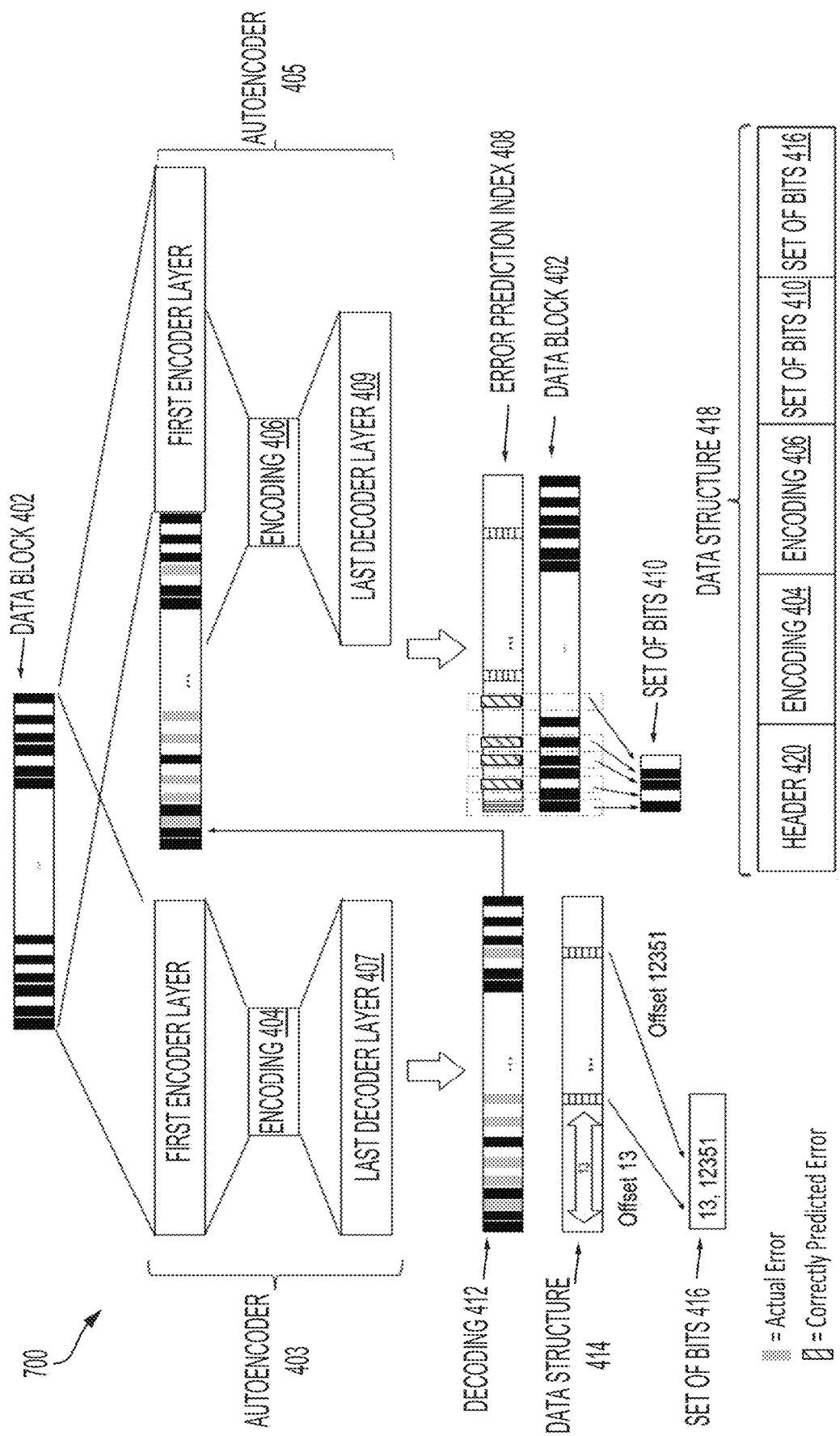
FIG. 7 depicts another example variant of the compression process.

FIG. 7 depicts another example alternative to the compression flow 400 of FIG. 4. More specifically, FIG. 7 depicts an example compression flow 700 involving the autoencoders 403 and 405. In FIG. 7 as in FIG. 4, each of the autoencoders 403 and 405 may comprise one or more encoder layers and one or more decoder layers, and the last encoder layer may serve as input to the first decoder layer. Again, for the purpose of providing a clear explanation, only the first encoder layer and the last decoder layer 407, 409 of each of the autoencoders 403 and 405 are depicted in FIG. 7. However, in the example compression flow 700, the decoding 412 as well as the data block 402 is provided as input to the autoencoder 405.

All other descriptions of the example compression flow 400 may be applicable to the example compression flow 700.

Example Approaches for Decompression of Losslessly Compressed Data

Figure 5A:
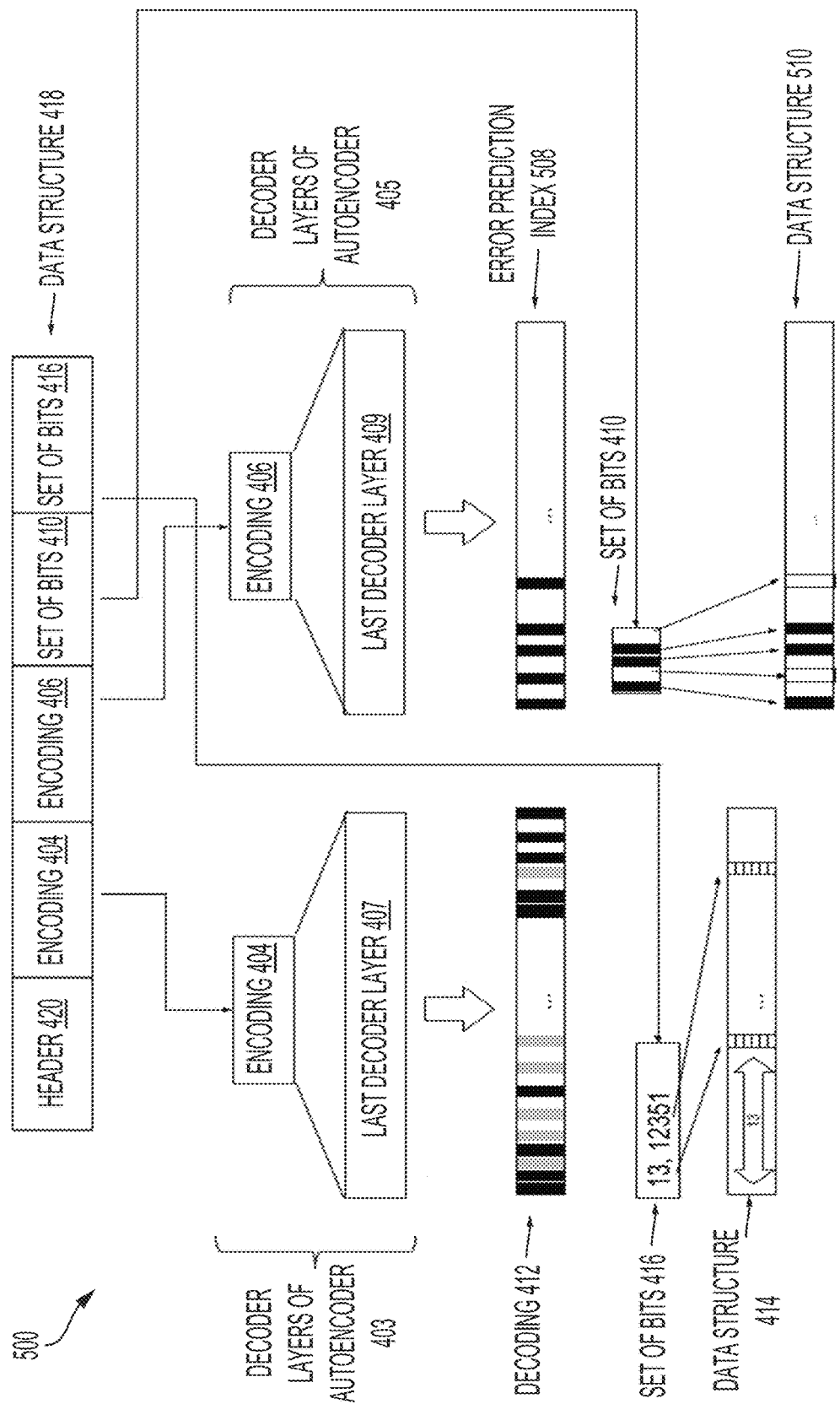
FIGS. 5A-B depict an example decompression process.
Figure 5B:

FIGS. 5A-B depict an example decompression process that can be used to decompress the data structure 418 resulting from the example compression flows 400 and 700. The decompression process includes an example decompression flow 500 of FIG. 5A and an example decompression flow 520 of FIG. 5B. In the example decompression flow 500, various parts of the data structure 418 are processed to generate the decoding 412, the error prediction index 508, the data structure 414, and the data structure 410. In the example decompression flow 520, the decoding 412, the error prediction index 508, the data structure 414, and the data structure 410 are manipulated to re-create the data block 402.

Referring to FIG. 5A, the data structure 418 is depicted as including the header 420, the encoding 404, the encoding 406, the set of bits 410, and the set of bits 416. Each of these parts of the data structure 418 may be used in the example compression flow 500 as described below.

The header 420 may be analyzed to determine a decompressor identifier. In addition to indicating that the data structure 418 corresponds to a losslessly compressed version of the data block 402, the decompressor identifier may also indicate that the decoder layers of the autoencoders 403 and 405 should be used to perform decompression.

The encoding 404 may be provided as input to the decoder layers of the autoencoder 403. As a result, the last decoder layer 407 may yield the decoding 412.

The encoding 406 may be provided as input to the decoder layers of the autoencoder 405. As a result, the last decoder layer 409 may yield the error prediction index 508.

The error prediction index 508 and the set of bits 410 may be provided as input to a "scatter" operation that is used to generate a data structure 510. More specifically, the error prediction index 508 may be used to determine one or more locations in the data structure 510 for storing one or more bit values of the set of bits 410. Thus, the data structure 510 can be thought of as a container that has the same size as the data block 402 and that stores "corrected" values for predicted error. In some embodiments, the scatter operation may be a SIMD scatter operation.

The set of bits 416 may be used to generate the data structure 414. Conceptually, the data structure 414 may be another way to represent the set of bits 416. More specifically, the set of bits 416 may store one or more offsets corresponding to one or more locations in the data structure 414 where one or more bits should be set to indicate unpredicted error.

In some embodiments, parts of the example decompression flow 500 may be performed in parallel. For example, the decoding 412, the error prediction index 508, and the data structure 414 may be generated concurrently.

Referring to FIG. 5B, the example decompression flow 520 involves the decoding 412, the error prediction index 508, the data structure 510, and the data structure 414. As described in greater detail below, each of these data structures may be used to re-create the data block 402.

The decoding 412 and the error prediction index 508 may be used to generate a data structure that has the same size as the data block 402 and that selectively stores bit values of the decoding 412. More specifically, the data structure may accurately store bit values that do not correspond to predicted error but may store the same arbitrary bit value, such as "0," where error is predicted. This may be achieved based on performing a bitwise "NAND" operation between the decoding 412 and the error prediction index 508. It should be appreciated that this operation can be performed in a variety of different ways.

For example, in FIG. 5B, bit values of the error prediction index 508 are inverted to generate an inverse 522 of the error prediction index 508. Conceptually, the inverse 522 is designed to filter out predicted error. Thereafter, a bitwise "AND" operation is performed between the inverse 522 and the decoding 412. The resulting intersection 524 of the decoding 412 and the inverse 522 accurately reflects bit values in the decoding 412 that do not correspond to predicted error, whereas bits that correspond to predicted error are all set to a value of zero.

Other possible ways for performing a bitwise "NAND" operation between the decoding 412 and the error prediction index 508 include the following:
 generating an inverse of the decoding 412, and then performing a bitwise "AND" operation between the inverse and the error prediction index 508; and
 performing a bitwise "AND" operation between the decoding 412 and the error prediction index 508, and then generating an inverse of the result.

In some embodiments, the bitwise "NAND" operation between the decoding 412 and the error prediction index 508 may be performed concurrently with generating the data structure 510.

The data structure 510 and the intersection 524 may be used to generate a data structure that has the same size as the data block 402 and that "corrects" the decoding 412 for predicted error. This may be achieved based on performing a bitwise "OR" operation between the data structure 510 and the intersection 524. Thus, only error that is unpredicted remains in the resulting union 526 of the intersection 524 and the data structure 510.

To correct for unpredicted error, a bitwise "XOR" operation may be performed between the data structure 414 and the union 526. For example, the data structure 414 may be implemented as a bitmask storing the bit value "1" at offsets corresponding to unpredicted error, thereby enabling the bitwise "XOR" operation to correct unpredicted error based on flipping bit values. As depicted in FIG. 5B, the result 528 is an exact match of the data block 402.

The example decompression process of FIGS. 5A-B may be modified to decompress the data structure 618 resulting from the example compression flow 600 of FIG. 6. More specifically, the encoding 605 may be provided as input to the decoder layers of the autoencoder 604. As a result, the output decoder layer 607 yields the decoding 412, and the error decoder layer 609 yields the error prediction index 508. The example decompression process of FIGS. 5A-B may be the same otherwise.

Example Computer System

Figure 8:
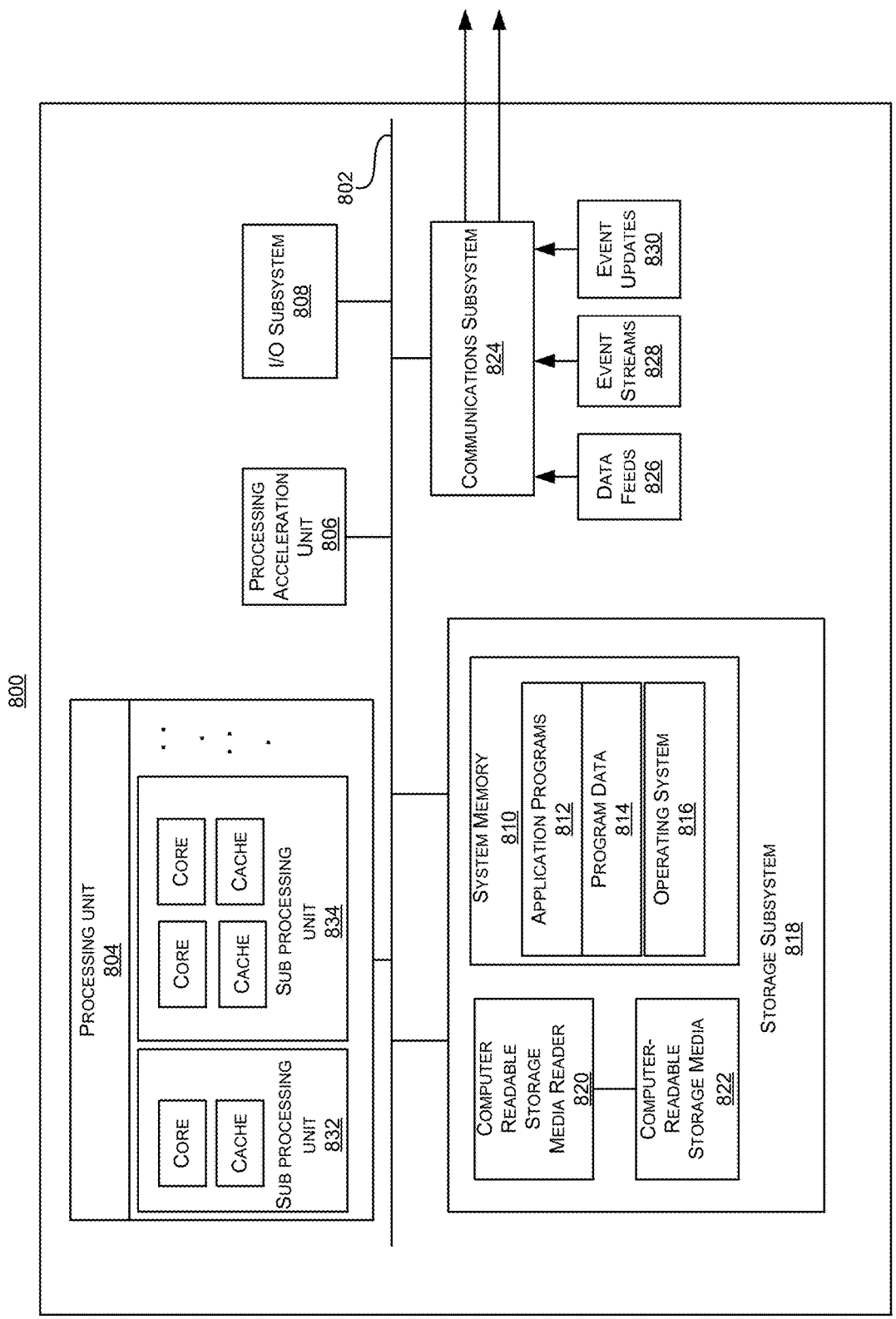
FIG. 8 depicts an example computer system upon which embodiments may be implemented.

FIG. 8 depicts an example computer system 800, in which various embodiments of the present application may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or LINUX™ operating systems, a variety of commercially-available UNIX® or UNIX-like operating systems (including without limitation the variety of GNU/LINUX™ operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present application.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 827, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the application are described with reference to specific embodiments thereof, but those skilled in the art will recognize that the application is not limited thereto. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the application are described with reference to specific embodiments thereof, but those skilled in the art will recognize that the subject matter of the application is not limited thereto. Various features and aspects of the above-described examples may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method comprising:
   receiving an input dataset including a set of data blocks;
   identifying a subset of bits of a data block of the set of data blocks, wherein a size of the subset of bits is selected based on a size of the data block;
   generating one or more vectors that form an embedding, wherein the one or more vectors are generated by executing a neural network over one or more iterations, wherein the neural network uses the subset of bits to generate the one or more vectors, and wherein the neural network generates vectors from data blocks of non-fixed sizes;
   deriving a compressor identifier from a compressor map, wherein deriving includes using the embedding and at least one vector, wherein the compressor map is a multi-dimensional array, and wherein the compressor identifier is associated with a corresponding compressor model; and
   compressing the data block using the corresponding compressor model associated with the compressor identifier.

2. The method of claim 1, wherein the subset of bits includes the last n-bits of the data block.

3. The method of claim 1, further comprising:
   executing a storage operation, wherein the storage operation includes storing a losslessly compressed version of the input dataset.

4. The method of claim 1, further comprising:
   executing the neural network using a second data block of the set of data blocks, wherein the neural network is configured to output at least one vector;
   deriving a compressor identifier using the embedding and the at least one vector; and
   compressing the second data block using compressor model corresponding to the compressor identifier.

5. The method of claim 1, wherein the embedding is a n-dimensional map.

6. The method of claim 1, wherein the input dataset includes a first data block that is of a first size and a second data block that is of a second size, wherein the first size and the second size are different.

7. A system comprising:
   one or more processors; and
   a non-transitory computer-readable medium storing instructions that when executed by one or more processors, cause the one or more processors to perform operations including:
     receiving an input dataset including a set of data blocks;
     identifying a subset of bits of a data block of the set of data blocks, wherein a size of the subset of bits is selected based on a size of the data block;
     generating one or more vectors that form an embedding, wherein the one or more vectors are generated by executing a neural network over one or more iterations, wherein the neural network uses the subset of bits to generate the one or more vectors, and wherein the neural network generates vectors from data blocks of non-fixed sizes;
     deriving a compressor identifier from a compressor map, wherein deriving includes using the embedding and at least one vector, wherein the compressor map is a multi-dimensional array, and wherein the compressor identifier is associated with a corresponding compressor model; and
     compressing the data block using the corresponding compressor model associated with the compressor identifier.

8. The system of claim 7, wherein the subset of bits includes the last n-bits of the data block.

9. The system of claim 7, wherein the operations further include:
   executing a storage operation, wherein the storage operation includes storing a losslessly compressed version of the input dataset.

10. The system of claim 7, wherein the operations further include:
    executing the neural network using a second data block of the set of data blocks, wherein the neural network is configured to output at least one vector;
    deriving a compressor identifier using the embedding and the at least one vector; and
    compressing the second data block using compressor model corresponding to the compressor identifier.

11. The system of claim 7, wherein the embedding is a n-dimensional map.

12. The system of claim 7, wherein the input dataset includes a first data block that is of a first size and a second data block that is of a second size, wherein the first size and the second size are different.

13. A non-transitory computer-readable medium storing instructions that when executed by one or more processors, cause the one or more processors to perform operations including:

receiving an input dataset including a set of data blocks;

identifying a subset of bits of a data block of the set of data blocks, wherein a size of the subset of bits is selected based on a size of the data block;

generating one or more vectors that form an embedding, wherein the one or more vectors are generated by executing a neural network over one or more iterations, wherein the neural network uses the subset of bits to generate the one or more vectors, and wherein the neural network generates vectors from data blocks of non-fixed sizes;

deriving a compressor identifier from a compressor map, wherein deriving includes using the embedding and at least one vector, wherein the compressor map is a multi-dimensional array, and wherein the compressor identifier is associated with a corresponding compressor model; and compressing the data block using the corresponding compressor model associated with the compressor identifier.

14. The non-transitory computer-readable medium of claim 13, wherein the subset of bits of the data block includes the last n-bits of the data block.

15. The non-transitory computer-readable medium of claim 13, wherein the operations further include:

executing a storage operation, wherein the storage operation includes storing a losslessly compressed version of the input dataset.

16. The non-transitory computer-readable medium of claim 13, wherein the operations further include:

executing the neural network using a second data block of the set of data blocks, wherein the neural network is configured to output at least one vector;

deriving a compressor identifier using the embedding and the at least one vector; and compressing the second data block using compressor model corresponding to the compressor identifier.

17. The non-transitory computer-readable medium of claim 13, wherein the embedding is a n-dimensional map.

18. The non-transitory computer-readable medium of claim 13, wherein the input dataset includes a first data block that is of a first size and a second data block that is of a second size, wherein the first size and the second size are different.

* * * * *